United States Patent [19]
Robbins

[11] Patent Number: 5,149,188
[45] Date of Patent: Sep. 22, 1992

[54] SOLAR POWERED EXTERIOR LIGHTING SYSTEM

[75] Inventor: Steven Robbins, Miami, Fla.

[73] Assignee: Solar Outdoor Lighting, Inc., Boca Raton, Fla.

[21] Appl. No.: 678,759

[22] Filed: Apr. 1, 1991

[51] Int. Cl.[5] .............................................. F21L 15/08
[52] U.S. Cl. .................................... 362/183; 362/431; 362/432; 362/802
[58] Field of Search ............... 362/183, 249, 431, 432, 362/802, 396, 370

[56] References Cited

U.S. PATENT DOCUMENTS

| | | | |
|---|---|---|---|
| 567,116 | 1/1896 | Bailey | 362/431 |
| 3,050,620 | 8/1962 | Schlosser et al. | 362/431 |
| 4,200,904 | 4/1980 | Doan | 362/183 |
| 4,281,369 | 7/1981 | Batte | 362/183 |
| 4,319,310 | 3/1982 | Kingsley | 362/183 |
| 4,384,317 | 5/1983 | Stackpole | 362/249 |
| 4,459,649 | 7/1984 | Shaneour | 362/432 |
| 4,481,562 | 11/1984 | Hickson | 362/183 |
| 4,486,820 | 12/1984 | Baba et al. | 362/802 |
| 4,718,185 | 1/1988 | Conlin et al. | 362/183 |
| 4,751,622 | 6/1988 | Williams | 362/183 |
| 4,827,389 | 5/1989 | Crum | 362/431 |
| 4,835,664 | 5/1989 | Wen | 362/183 |
| 4,841,416 | 6/1989 | Doss | 362/183 |

FOREIGN PATENT DOCUMENTS

| | | | |
|---|---|---|---|
| 984359 | 2/1976 | Canada | 362/431 |

*Primary Examiner*—Ira S. Lazarus
*Assistant Examiner*—Sue Hagarman
*Attorney, Agent, or Firm*—Krass & Young

[57] ABSTRACT

A self-contained solar powered light having a battery system where the battery container is mounted between two cantilevered arms on an upright vertical support. The light element is mounted at the distal end of one of the cantilevered arms. The photovoltaic panels are mounted on the upper cantilevered arm and point upward toward the sun. A computer is operably connected between the battery and the photovoltaic panels and the light element to determine when the light element should be actuated and deactuated based upon amperage produced by the photovoltaic panels. The vertical support has a U-shaped cross member which can engage poles with circular cross section or poles with external side flats. Threaded fasteners fix the vertical support onto the pole member.

11 Claims, 4 Drawing Sheets

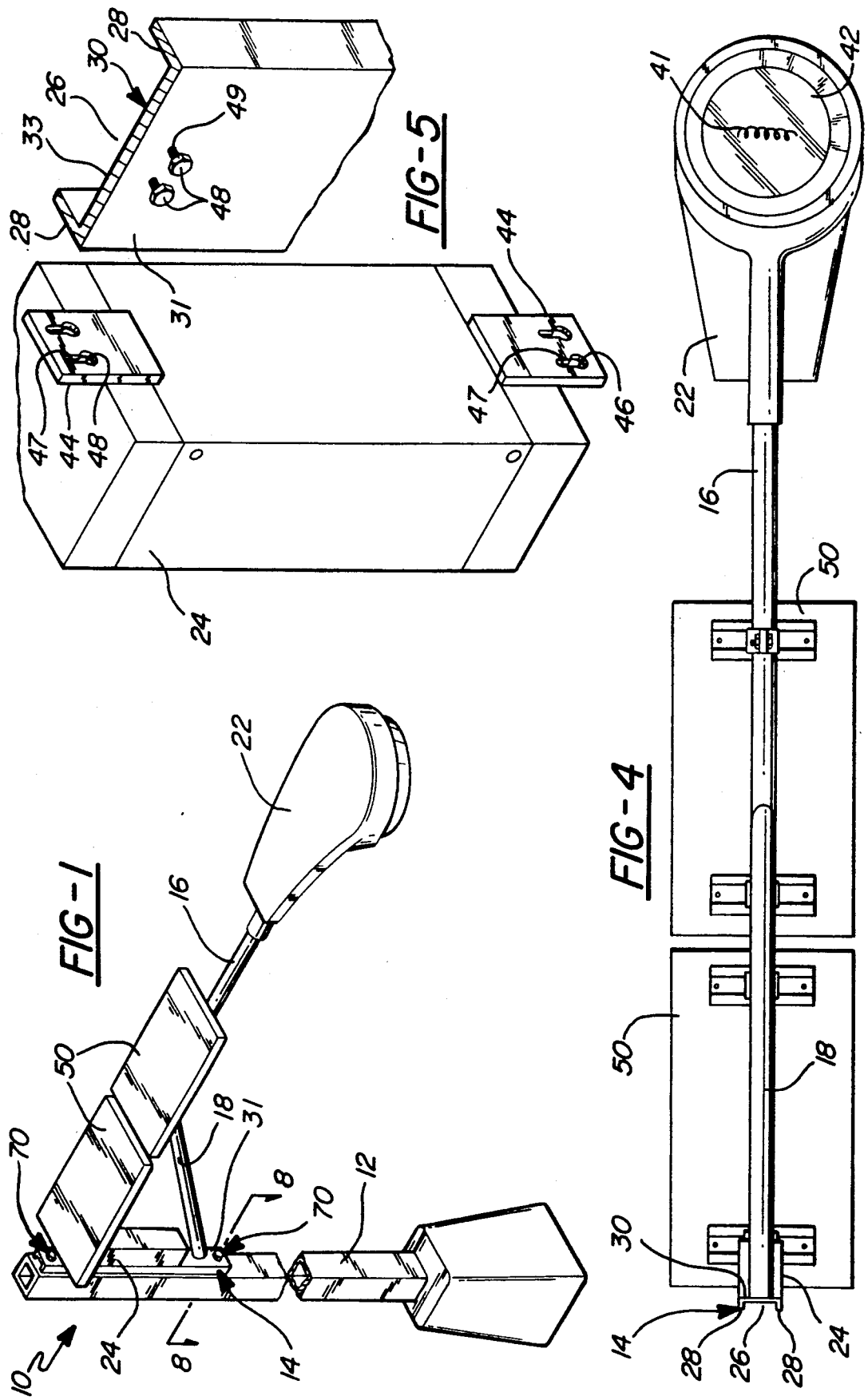

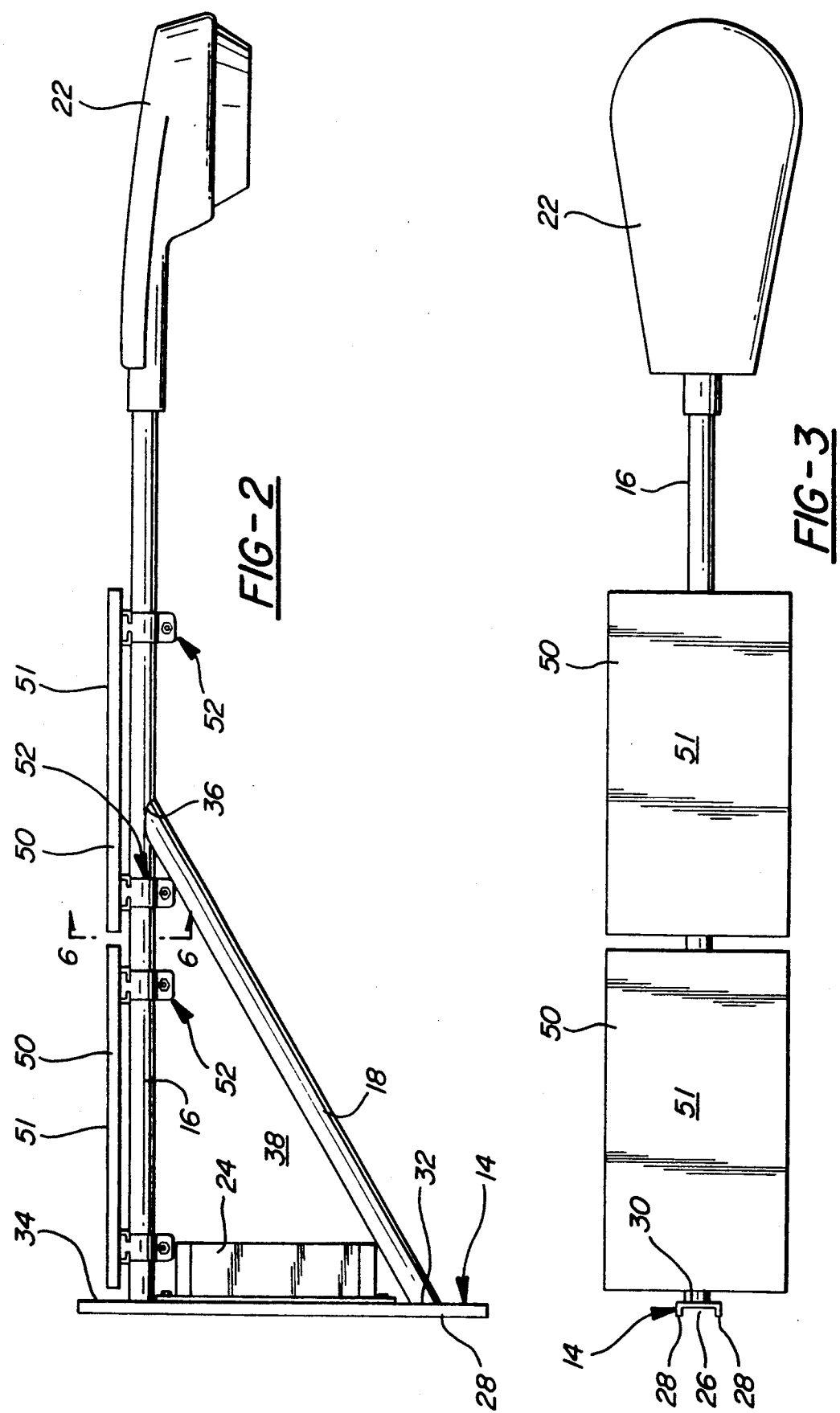

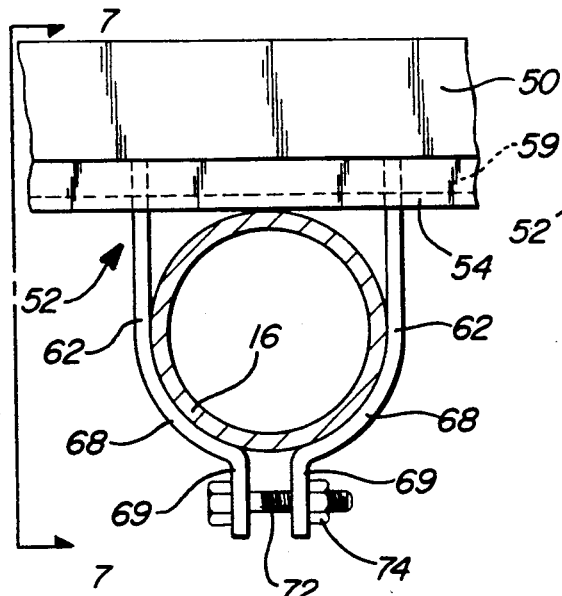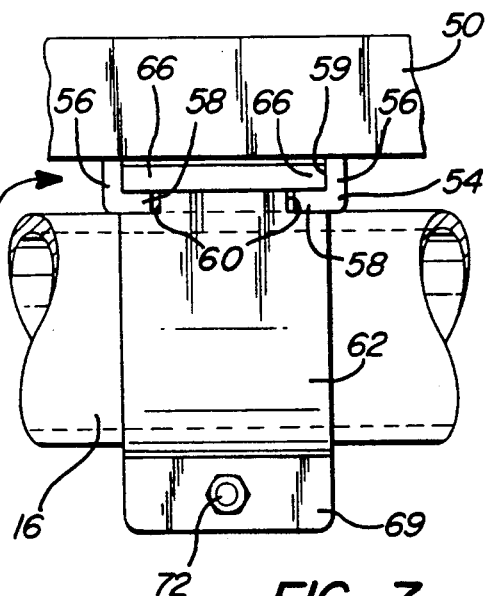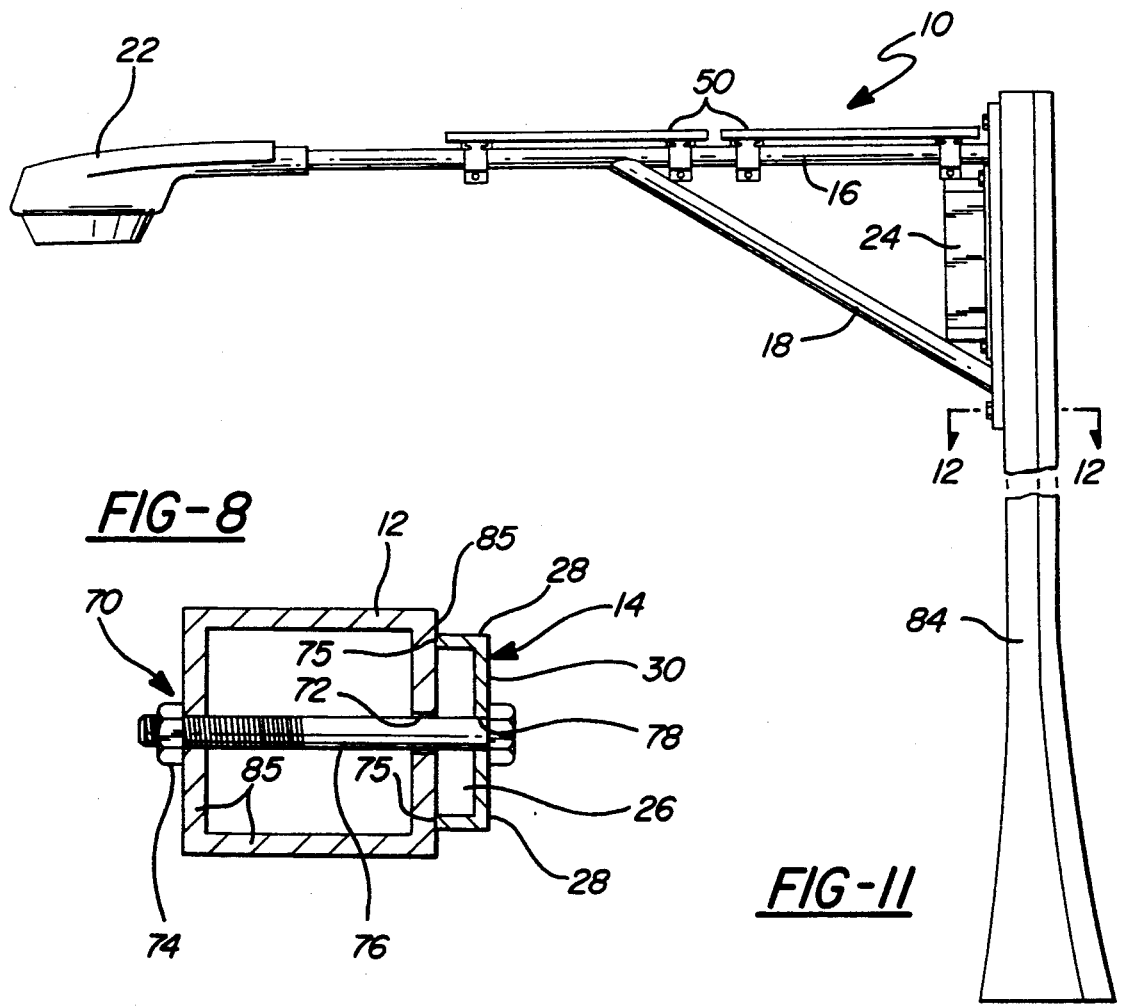

5,149,188

SOLAR POWERED EXTERIOR LIGHTING SYSTEM

TECHNICAL FIELD

The present invention relates to exterior lighting and more particularly to photovoltaic panels connected to a storage battery which in turn is operably connected to an exterior lighting element.

BACKGROUND OF THE INVENTION

Exterior lighting systems have been used for many applications including outdoor stadiums, municipal highways, sidewalks, patios and parking lots. It is most common to have these exterior lights powered by electricity that has been generated at a remote location either by a hydroelectric power plant, fossil fuel burning power plant or a nuclear power plant. In recent times, concerns have been raised that the high demand for electricity is taxing the capacity of existing electrical generating plants. Furthermore, concerns regarding the availability and environmental safety of fossil and nuclear fuel are being raised. As a result of the above factors, the price of electricity has significantly increased and other alternate means of lighting are now becoming practical.

Various exterior lighting systems have been devised using photovoltaic panels commonly referred to as solar panels in conjunction with batteries. These exterior lighting systems have been designed such that sunlight impinging on a solar panel charges a battery during the day time. The battery can subsequently provide a source of electricity for a lighting element during the nighttime. These systems all are fabricated particularly for the battery being mounted in or about a fixed vertical pole. These systems, by being specifically adapted to require a special pole which must have an access panel, limit the applicable uses for a lighting element structure.

What is needed is a solar powered battery storage lighting system that is adaptable to variety of applications and which can be expeditiously mounted on top of a metal or cement pole support or alternately mounted against a flat vertical member such as a wall.

SUMMARY OF THE DISCLOSURE

In accordance with one aspect of the invention, a lighting system includes a substantially vertical support member having a lower cantilevered support arm and a upper cantilevered support arm extending from the vertical support member to form a frame assembly. The two cantilevered arms are connected at a point spaced away from the vertical support member. A lighting element is desirably connected to the distal end of one of the support arms. A photovoltaic panel is connected to one of the cantilevered support arms for receiving sunlight and converting it into electrical power. An electrical storage battery preferably in a storage container is mounted to the frame assembly between the two cantilevered support arms for providing power to the light element. The electrical storage battery, the photovoltaic panel and the lighting element are operably interconnected together via a control means for actuating and deactuating the lighting element in response to the ambient sun light conditions about the lighting system. This can be accomplished by use of a photocell that measures the daylight or by a device that measures the amount of electricity being generated by the solar panels. It is preferable that a storage battery is mounted within a perimeter of the frame assembly defined by the vertical support member and the two cantilevered support arms. The photovoltaic panel is preferably pivotally connected to the upper cantilevered support arm so they can be aligned toward the sunlight and provide a slope so that rain water can drain therefrom.

The vertical support member is adapted to be mounted on top of a pole or to be attached to a vertical member such as a wall. In a preferred embodiment, the vertical support is a U-shaped bracket having a channel facing away from the light element such that the U-shaped bracket can engage and be mounted to the side of a circular in cross section steel pole with the side walls of the U-shaped bracket providing lateral rigidity against the steel pole. The U-shaped bracket can also be sized such that it can be mounted against the periphery of the standard cement light pole. The U-shaped bracket can also be mounted against a flat wall support. The cantilevered arms are preferably tubular members welded onto the U-shaped bracket. In one embodiment the U-shaped bracket can have holes through which the tubular members extend and are welded thereto.

In a preferred embodiment, the container that houses the battery has two tabs which abut against a wall of the U-shaped channel and engage mounting bolts extending from the U-shaped channel.

In the preferred embodiment, the photovoltaic panels have mounting channels that run transverse to the length of the cantilevered arm. The channels have a clamping surface therein which are engaged by a tab of a bracket that extends into the channel. A second bracket extends into the channel and is disposed at an opposite side of the cantilevered arm such that when the two brackets are bolted together the brackets clamp the clamping surface against the cantilevered arm to affix the solar panel in place. Preferably, each panel has at least two axially displaced channels that each engage two brackets.

In this fashion the frame assembly mounts a complete and functional lighting system and can be adapted to a variety of uses such as streetlamps by being mounted to either steel or cement poles. The exterior lighting system can also be mounted directly against a wall member. The battery container and solar panels are positioned such that they do not interfere with the variety of mountings in which the vertical support member can be used.

BRIEF DESCRIPTION OF THE DRAWINGS

Reference now is made to the accompanying drawings in which:

FIG. 1 is a perspective view of a streetlight incorporating a light assembly in accordance to one embodiment of the invention;

FIG. 2 is a side elevational view of the light assembly shown in FIG. 1;

FIG. 3 is a top plan view thereof;

FIG. 4 is a bottom plan view thereof;

FIG. 5 is a fragmentary and exploded view illustrating the connection between the battery container and vertical support member;

FIG. 6 is a cross-sectional view taken along the lines 6—6 shown in FIG. 2;

FIG. 7 is a cross-sectional view taken along the lines 7—7 shown in FIG. 6;

FIG. 8 is an enlarged cross-sectional view taken along lines 8—8 shown in FIG. 1;

FIG. 11 is a perspective view of the light assembly mounted onto a cement street light pole;

DESCRIPTION OF THE PREFERRED EMBODIMENTS

Figure 12:
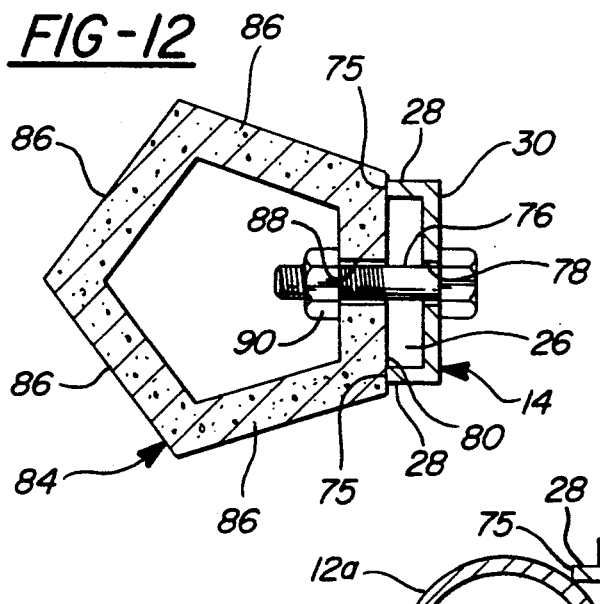
FIG. 12 is a cross-sectional view taken along the lines 12—12 shown in FIG. 11.
Figure 9:
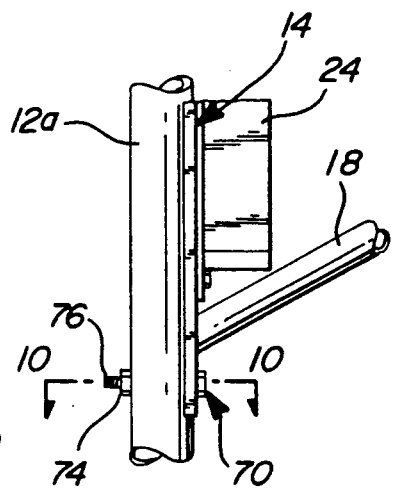
FIG. 9 is a fragmentary side elevational view of the light assembly mounted to a circular pole.
Figure 10:
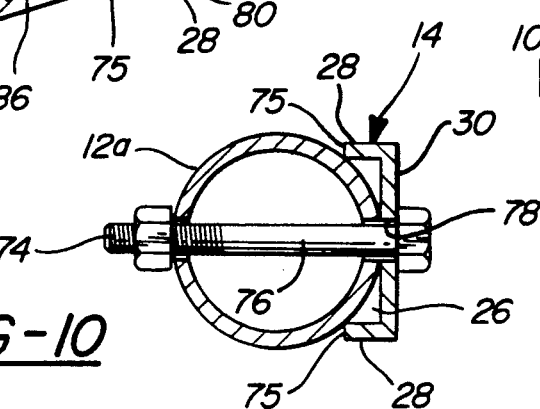
FIG. 10 is a cross-sectional view taken along the lines 10—10 in FIG. 9.

Referring now to the drawings and in particularly FIG. 1, a solar powered lighting assembly 10 is mounted near the top of a square steel streetlight pole 12. The lighting assembly 10 includes a substantially vertical support member 14 and two cantilevered arms 16 and 18 that form a frame assembly 20. At the distal end of the cantilevered arm 16 is a light fixture 22. A battery container 24 is mounted on the vertical support 14.

The construction of the lighting assembly 10 is shown in more detail in FIGS. 2, 3 and 4. As shown in these figures, the vertical support member 14 is generally U-shaped to form an open channel 26 situated between two side walls 28. A front wall 30 having an exterior surface 31 and interior surface 33 spans between the two side walls 28. The interior surface 33 and two side walls 28 define the vertically oriented channel 26. The lower cantilevered arm 18 has its one end 32 cut at an angle such that it flushly abuts the front wall 30 and is welded thereto. Similarly cantilevered arm 16 has its end 34 cut so that it flushly abuts the front wall 30 and is welded thereto. The cantilevered arm 18 and 16 are also welded together at location 36. The two cantilevered arms 16, 18 and vertical support member 14 form a triangular shaped assembly with an open interior section 38. Alternatively, vertical support may have apertures sized to receive ends 32 and 34 which then can be welded in place.

The light fixture 22 can include a sodium lamp, halogen lamp or any other conventional lighting element 41 that is suitable for exterior use. The fixture 22 may have a transparent or translucent lens cover 42 to refract and disperse light in any desired fashion.

The battery container 24 is mounted within the open triangular interior section 38 onto the vertical support member 14. The battery container mounting is shown in more detail in FIG. 5 where the container 24 has two tabs 44 at its extending upwardly and downwardly respectively member 14 with its two side walls 28 and its front wall 30 snugly fits in the space 45 defined between the tabs 44 such that the tabs 44, abut against the side walls 28. Each tab 44 has a hole 46 and slot 47 upwardly extending therefrom. The hole 46 is sized to laterally engage two threaded bolts 48 which are threaded into holes 49 or otherwise affixed in the front wall 30 and extend horizontally therefrom. Once the container 24 is mounted against the front wall 30 and the bolts 48 are within the slots 47, the bolts 49 can be tightened to affix the tabs 44 in place and to secure the container 24 onto the vertical support 14.

Referring back to FIGS. 2–4, a pair of photovoltaic panels 50 are mounted on the top cantilever arm 16 with the photovoltaic surface 51 facing upwardly such that sunlight can impinge thereupon. The panels 50 are attached to the cantilevered arm 16 by bracket assemblies 52. One bracket assembly 52 is illustrated in more detail in FIGS. 6 and 7. The bracket assembly 52 includes a channel member 54 attached to the panels 50. Each panel 50 has two axially spaced channel members 54 affixed thereto that extend transversely to the cantilever arm 16. Each channel member 54 has downwardly extending side walls 56. The side walls 56 at their lower edge have inwardly turned flanges 58 which provide for an opening 60 therebetween. The channel member 54 with its side walls 56 and flanges 58 define a channel 59 therein.

A pair of bracket member 62 each have a pair of distal tabs 66 that fit within the channel 59 above flanges 58. Two opposing slots 64 of the bracket members 62 receive the flange 58. The bracket 62 has a contoured section 68 which extends laterally besides the upper cantilevered arm 16. Each bracket 62 has a lower connecting section 69 with an aperture 70 therethrough. A bolt 72 and nut 74 are used to draw the two connecting sections 69 together which in turn pull the tabs 62 down to clamp against the flanges 58 and force the flanges 58 against the arm 16. As particularly shown in FIG. 6, the bracket assembly 52 can be fastened securely on the arm 16 in an adjustable fashion to affix the panels 50 in a plurality of positions. The panels 50 can be pivoted to a horizontal position with the photovoltaic surface 51 facing directly upward or the panels 50 be slightly canted to provide for water to drain therefrom and/or to provide a more direct angle to an inclined sun. The pivotal adjustments of the panels is about the longitudinal axis of arm 16.

Referring now to FIGS. 1 and 8, the lighting assembly is connected to the square steel pole 12 via vertical support member 14. The width of each flat side 85 of pole 12 is greater than spacing 45 between flanges 28 such that the rear distal edges 75 abut the pole side 85. The lighting pole 12 has two standard vertically spaced openings 72 therethrough. The U-shaped bracket has similarly spaced openings 78 in its front wall 30. Fastener connectors 70 include bolts 76 passing through openings 78 and through openings 72. A nut 74 engages bolt 76 to fasten the lighting assembly 16 onto the pole 12. The nut 74 may optionally be welded in place onto or in pole 12.

Referring now to FIGS. 11 and 12, the lighting assembly 10 can also be connected to the circular steel pole 12a via the vertical support member 14. The pole 12a extends substantially within channel 29. The typical outer diameter dimensions of the pole 12a are five inches. The side walls 28 are positioned to be four inches apart and are long enough such that the rear distal edges 75 abut the periphery 80 of pole 12a when the inside surface 33 of front wall 30 abuts the periphery at location 82. The combination of the two vertically spaced connectors 70 with the abutment of side walls 28 and front wall 30 against pole 12a provide for a stable fixed connection between the frame assembly 20 and the light pole 12a.

The frame assembly 20 is also adapted to be securely mounted onto a cement pole as shown in FIGS. 11 and 12. A cement pole 84 is typically tapered and has a pentagonal cross-section with five exterior flats 86. One of the flats 86 has two vertically spaced apertures 88 therethrough that can be provided with a threaded nut 90 affixed thereto and aligned with aperture 88. The pole is tapered such that each flat 86 has a nine inch width toward the bottom of the pole and has an approximately five inch width toward the top of the pole. Since the side walls 28 of vertical support 14 are four inches apart, the walls 28 abut against one of the side walls 86. The bolts 76 pass through the apertures 78 in front wall 30 and pass through the openings 88 and threaded nut 90 to engage the pole 84. The rear distal edges 75 of walls 28 abut the flat 86 and the bolts 76 secure the vertical support 14 against the flat 86 to fixedly mount frame assembly 20 onto cement pole 84.

Besides being adaptable to be secured onto both steel and cement poles, the frame assembly 20 can also be secured against a vertical wall in much the same fashion as shown for the cement pole where a flat wall would abut against the side walls 28 and the threaded bolt 72 can extend through the front wall 30 of vertical support and a wall member in the same fashion as shown in FIG. 12.

Figure 13:
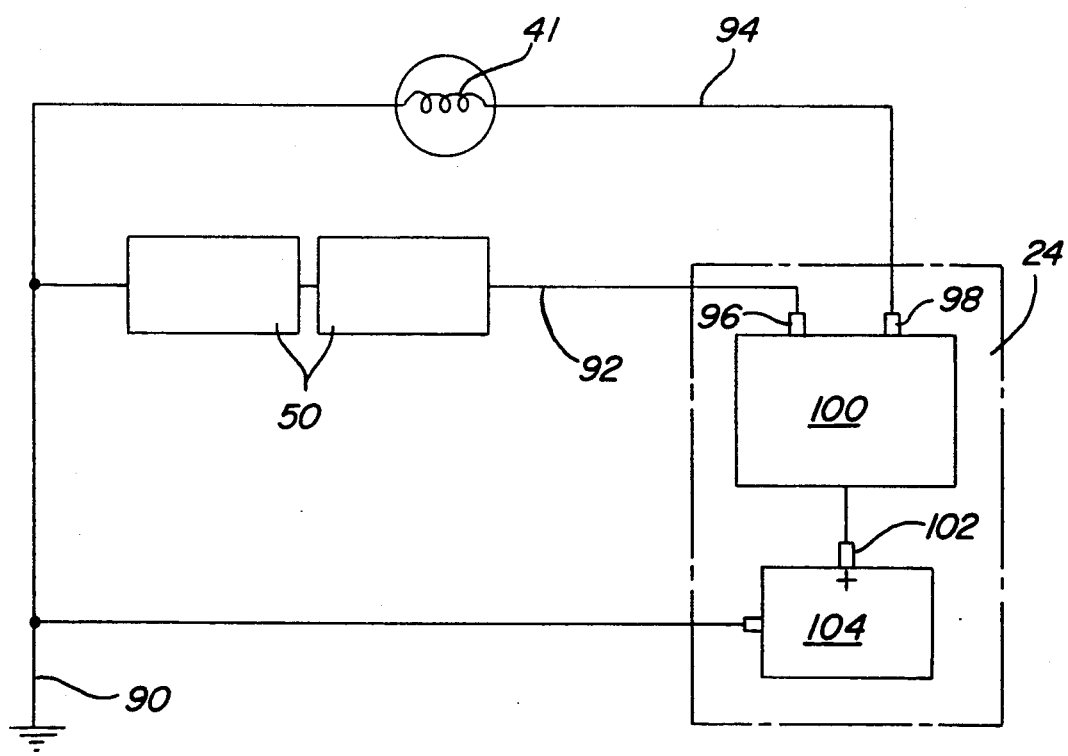
FIG. 13 is a schematic of the electrical circuit connecting the light element, solar panel, battery and control computer.

As shown in FIG. 13, the light element 41 and panels 50 have one end grounded at 90. The ground 90 can be achieved through the frame assembly 20 itself if it is made out of electrically conductive material, e.g. metal. The positive ends of the light element 22 and panels 50 have wires 92 and 94 running to the battery container 24. The container 24 houses the battery 104 and computer 100. The container has two isolated connectors 96 and 98 thereon which operably connect to a computer 100. The computer 100 is connected to the positive terminal 102 of the battery 104.

The computer 100 is a commercially available detector which detects the amperage output from the panels 50. If the amperage output is below a predetermined level, the computer closes the circuit between the terminal 102 and terminal 98 to complete the circuit to the light element 41. Conversely if the amperage level is over a predetermined amount the computer opens the circuit to the light element 41. It is also foreseen that a photo detector can be used in place of the computer 100 to measure the ambient sunlight directly to control the actuation and deactuation of the light element 22.

In this fashion, self-contained photovoltaic light assembly with power supply is adaptable to be mounted on cement poles, wood poles, metal poles or flat wall surfaces. The photovoltaic panels are easily mounted on a frame member via brackets and channel assemblies. The battery container is easily mounted on the vertical support which is a U-shaped channel via tabs having slots therein which engage bolts extending from the U-shaped vertical support. The battery container is protectively mounted between two cantilevered arms of the frame assembly. The photovoltaic panels are mounted on the top cantilevered arm and can be tilted.

Other variations and modifications are possible without departing from the scope and spirit as defined by the appended claims.

The embodiments in which an exclusive property and privilege is claimed are defined as follows:

1. A lighting system characterized by:
    a substantially vertical support member configured to fit upon a pole and to be mounted against a wall;
    an upper cantilevered support arm extending from said vertical support member at a first vertical point;
    a lower cantilevered support arm extending from said vertical support at a second vertical point and connected to the upper arm at a position spaced away from said vertical support to form a frame assembly;
    a lighting element connected at a distal end of one of said support arms;
    a photovoltaic panel mounted to the upper cantilevered support arm;
    an electrical storage battery mounted to said frame assembly within a perimeter of said frame assembly defined by said vertical support and said upper and lower cantilevered support arms;
    means for operably interconnecting said electrical storage battery, said photovoltaic panel, and said lighting element such that said photovoltaic panel delivers electrical power to said battery, and said battery selectively delivers electrical power to said lighting element; and
    control means for actuating and deactuating said lighting element in response to the ambient light condition about said lighting system.

2. A lighting system as defined in claim 1 further characterized by:
    said photovoltaic panel being mounted to said upper cantilevered support arm at a plurality of pivotably adjusted positions about the axis of said upper cantilevered support arm.

3. A lighting system as defined in claim 1 further characterized by:
    said vertical support member having a U-shaped cross-section with a spanning wall and two side walls forming a vertically oriented channel sized to receive a pole laterally within said channel with side walls and spanning wall and of the U-shaped channel abutting the pole; and
    fastener means for fastening said vertical support onto said pole when said pole is received in said channel.

4. A lighting system as defined in claim 3 further characterized by:
    said battery stored in a container having two vertically spaced tabs constructed to abut the vertical support member; and
    engaging means for engaging said tabs onto said vertical support member and affixing said battery box against said vertical support member.

5. A lighting system as defined in claim 3 further characterized by:
    said cantilevered arms being tubular and having a mounted end cut to flushly abut the vertical support member and being welded thereto.

6. A lighting system as defined in claim 1 further characterized by:
    said vertical support member having a U-shaped cross section with side walls spaced apart to abut a flat of a pole having a polygonal shaped periphery; and
    fastener means for fastening said vertical support member onto said pole.

7. A lighting system as defined in claim 1 further characterized by:
    said photovoltaic panel having a channel member with an opening facing said upper cantilevered arm to which it is mounted;
    said channel extending transverse to the longitudinal axis of said upper cantilevered arm;
    said channel having at least one clamping surface therein;
    at least a first fastening bracket extending in said channel and constructed to apply a clamping force on said clamping surface to secure said panel against said upper cantilevered arm.

8. A lighting system as defined in claim 7 further characterized by:
- a second fastening bracket extending in said channel to apply a clamping force on said clamping surface;
- said first and second fastening brackets extending on opposite lateral sides of said upper cantilevered arm;
- a fastener means for drawing said first and second fastening brackets toward each other and urging said first and second fastening brackets to apply a clamping force on said clamping surface to secure said panel against said upper cantilevered arm.

9. A lighting system characterized by:
- a substantially vertical support member having two side walls with a channel defined therebetween, said channel being open to receive a support pole therein;
- a cantilevered support arm attached at its mounted end to said substantially vertical support member and having a light element attached to its distal end;
- a photovoltaic panel mounted to said cantilevered support arm, said photovoltaic panel including a channel extending transverse to the length of the cantilevered support arm and including at least one clamping surface therein;
- at least a first fastener bracket extending in said channel and having clamping means for applying a clamping force on said clamping surface toward said cantilevered arm to secure said panel against said one cantilevered arm;
- an electrical battery operably connected to said photovoltaic panel, to receive electrical power therefrom, and to said light element to deliver electrical power thereto; and
- control means for actuating and deactuating said light element in response to one of the ambient light conditions.

10. A lighting system as defined in claim 9 further characterized by:
- said battery stored in a container having two tabs vertically spaced to abut the outer surfaces of said substantially vertical support member;
- engaging means for engaging said tabs onto said vertical support member;
- fastening means for affixing said tabs in place onto said engaging means.

11. A lighting system as defined in claim 9 further characterized by:
- a second fastening bracket extending in said channel to apply a clamping form on said clamping surface;
- said first and second fastening bracket extending on opposite lateral sides of said one cantilevered arm;
- a fastener means for drawing said first and second fastening brackets toward each other and urging said first and second fastening brackets to apply a clamping force on said clamping surface to secure said panel against said one cantilevered arm.

* * * * *